(12) United States Patent
Matteucci et al.

(10) Patent No.: US 9,732,827 B2
(45) Date of Patent: Aug. 15, 2017

(54) BALANCING MACHINE FOR BALANCING VEHICLE WHEELS

(71) Applicant: SICAM S.R.L., Correggio (RE) (IT)

(72) Inventors: Marco Matteucci, Correggio (IT); Alessandro Gilocchi, Correggio (IT)

(73) Assignee: SICAM S.R.L., Correggio (IT)

( * ) Notice: Subject to any disclaimer, the term of this patent is extended or adjusted under 35 U.S.C. 154(b) by 287 days.

(21) Appl. No.: 14/418,201

(22) PCT Filed: Jul. 23, 2013

(86) PCT No.: PCT/IB2013/001601
§ 371 (c)(1),
(2) Date: Jan. 29, 2015

(87) PCT Pub. No.: WO2014/020396
PCT Pub. Date: Feb. 6, 2014

(65) Prior Publication Data
US 2015/0167780 A1    Jun. 18, 2015

(30) Foreign Application Priority Data

Jul. 31, 2012 (IT) .............................. MO2012A0192

(51) Int. Cl.
*G01M 17/013* (2006.01)
*F16F 15/32* (2006.01)
(Continued)

(52) U.S. Cl.
CPC ............ *F16F 15/322* (2013.01); *F16F 15/36* (2013.01); *G01M 1/225* (2013.01)

(58) Field of Classification Search
USPC ................... 73/115.07, 146, 146.2
See application file for complete search history.

(56) References Cited

U.S. PATENT DOCUMENTS

| 4,593,564 A |   | 6/1986 | Brihier |
|---|---|---|---|
| 5,307,279 A | * | 4/1994 | Christian ................ G01M 1/22 701/124 |

(Continued)

FOREIGN PATENT DOCUMENTS

| FR | 2 651 884 A1 | 3/1991 |
|---|---|---|
| WO | 2010/133364 A1 | 11/2010 |

OTHER PUBLICATIONS

International Search Report, dated Oct. 31, 2013, from corresponding PCT application.

*Primary Examiner* — Eric S McCall
(74) *Attorney, Agent, or Firm* — Young & Thompson

(57) ABSTRACT

A machine for balancing vehicle wheels includes: a base frame; a balancing shaft on which a vehicle wheel to be balanced can be fixed; a rotoidal resting unit, fitted on the base frame and supporting the balancing shaft in a revolving way around its own axis; and motor elements for placing in rotation the balancing shaft around its own axis; wherein the balancing shaft includes at least a measuring section which is magnetized and subject to a stress condition due to the unbalance of the wheel revolving on the balancing shaft, in proximity of the measuring section being arranged magnetic field sensor elements which are suitable for detecting by magnetostrictive effect the stress condition of the measuring section and are operatively associated with at least one processing and control unit suitable for determining the unbalance of the wheel starting from the stress condition of the measuring section.

20 Claims, 5 Drawing Sheets

(51) Int. Cl.
    *G01M 1/22*     (2006.01)
    *F16F 15/36*    (2006.01)

(56)            References Cited

U.S. PATENT DOCUMENTS

| | | | | |
|---|---|---|---|---|
| 5,983,717 A * | 11/1999 | Diez | ............... | G01M 1/02 |
| | | | | 73/462 |
| 2003/0046999 A1* | 3/2003 | Hansen | ............... | G01M 1/045 |
| | | | | 73/487 |
| 2003/0051548 A1* | 3/2003 | Hansen | ............... | G01M 1/045 |
| | | | | 73/487 |
| 2004/0244483 A1* | 12/2004 | Gerdes | ............... | G01M 1/02 |
| | | | | 73/459 |
| 2005/0005686 A1* | 1/2005 | Oppermann | ............... | G01M 1/045 |
| | | | | 73/66 |
| 2005/0109106 A1* | 5/2005 | Hansen | ............... | G01M 1/045 |
| | | | | 73/487 |
| 2007/0069571 A1* | 3/2007 | Matteucci | ............... | G01M 1/326 |
| | | | | 301/5.21 |
| 2009/0266161 A1* | 10/2009 | Matteucci | ............... | G01M 1/02 |
| | | | | 73/460 |
| 2013/0008249 A1* | 1/2013 | Sotgiu | ............... | G01M 1/225 |
| | | | | 73/462 |
| 2013/0025372 A1* | 1/2013 | Ye | ............... | G01M 1/045 |
| | | | | 73/629 |
| 2014/0060182 A1* | 3/2014 | Matteucci | ............... | G01M 1/225 |
| | | | | 73/462 |

* cited by examiner

BALANCING MACHINE FOR BALANCING VEHICLE WHEELS

TECHNICAL FIELD

The present invention relates to a balancing machine for balancing vehicle wheels.

BACKGROUND ART

It is known that the wheels of vehicles are generally made up of a cylindrical metal rim having, at the axial extremities, annular flanges between which is defined a channel for the slot-in fitting of an elastic tyre, the side portions of which, so-called "beads", are stopped up fast on the annular flanges themselves.

Also known is the need to perform frequent balancing operations which consist in fitting specific balancing weights, made of lead or other material, in correspondence to predetermined points of the wheel and along the rim and the need to check the wheel's inclination to roll correctly following a geometric test of the rim and the tyre.

The fitting of the balancing weights does in fact offset, during wheel rotation, the presence of any tyre and/or rim irregularities which would lead to vibrations or stresses during vehicle movement.

To perform such operations, balancing machines are commonly used comprising a base frame supporting a horizontal shaft, so-called "balancing shaft", which is axially rotatable due to the action of motor means and on which the wheel rim is keyed by means of suitable engagement and centring parts.

The amount of wheel unbalance is determined during the rotation by suitable electronic or electromechanical devices, such as force transducers applied along the balancing shaft.

To the measurement of the unbalance must be generally added other characteristic measurements, such as the measurement of the roundness of the wheel, of the eccentricity of the wheel, of the level of wear of the tread, of the shape, of the rim or other wheel irregularities, normally taken by means of suitable measurement sensors with or without contact (i.e. optical sensors or feelers).

Once the necessary measurements have been taken, the machine is able to calculate the size and the position of the balancing weights to be fitted on the wheel rim to offset the wheel irregularities.

The balancing weights are usually fitted manually by an operator at one or more precise points of the wheel rim indicated by the machine.

These balancing machines of known type; however, do have a number of drawbacks.

To measure the unbalance, traditional machines have force sensors, of the load cell type with piezo ceramic effect, which have to inconveniently be arranged in correspondence to a pair of restraints or elastic supports by means of which the shaft-bearing structure is fastened to the base frame.

Such classic configuration is not always practical and easy to achieve and, in some cases, reaches a considerably high level of complexity that makes both assembly and any maintenance jobs difficult.

The type of force sensors used on common balancing machines, furthermore, is such as to permit detecting the oscillations of the balancing shaft to determine the wheel unbalance, but does not allow obtaining other pertinent information such as, e.g., its weight.

For this purpose, traditional balancing machines make use of information contained in an internal database in which are filed the weights of the main wheels available on the market with, naturally, the consequent problems tied to the approximation of such information which do not always reflect the real conditions of the actual wheel to be balanced.

Alternatively, the wheel weight can be entered manually by the operator with the consequent loss of time relating to the carrying out of weighing and data entering operations.

DESCRIPTION OF THE INVENTION

The main aim of the present invention is to provide a balancing machine for balancing vehicle wheels which is particularly simple from both the manufacturing and functional viewpoint.

Another object of the present invention is to provide a balancing machine which permits detecting the wheel weight in a practical, easy and functional way.

Not the last object of the present invention is to provide a balancing machine which is able to operate with greater precision and in lesser time than traditional machines equipped with conventional force transducers.

Another object of the present invention is to provide a balancing machine for balancing vehicle wheels which allows to overcome the mentioned drawbacks of the state of the art within the ambit of a simple and effective to use as well as low cost solution.

The above objects are achieved by the present balancing machine for balancing vehicle wheels, comprising:
- at least a base frame;
- at least a balancing shaft on which a vehicle wheel to be balanced can be fixed;
- at least a rotoidal resting unit, fitted on said base frame and supporting said balancing shaft in a revolving way around its own axis;
- motor means for placing in rotation said balancing shaft around its own axis;

characterized by the fact that said balancing shaft comprises at least a measuring section which is magnetized and subject to a stress condition due to the unbalance of said wheel revolving on said balancing shaft, in proximity of said measuring section being arranged magnetic field sensor means which are suitable for detecting by magnetostrictive effect said stress condition of the measuring section and are operatively associated with at least one processing and control unit suitable for determining the unbalance of said wheel starting from said stress condition of the measuring section.

BRIEF DESCRIPTION OF THE DRAWINGS

Other characteristics and advantages of the present invention will become more evident from the description of a preferred, but not sole, embodiment of a balancing machine for balancing vehicle wheels, illustrated purely as an example but not limited to the annexed drawings in which.

EMBODIMENTS OF THE INVENTION

Figure 1:
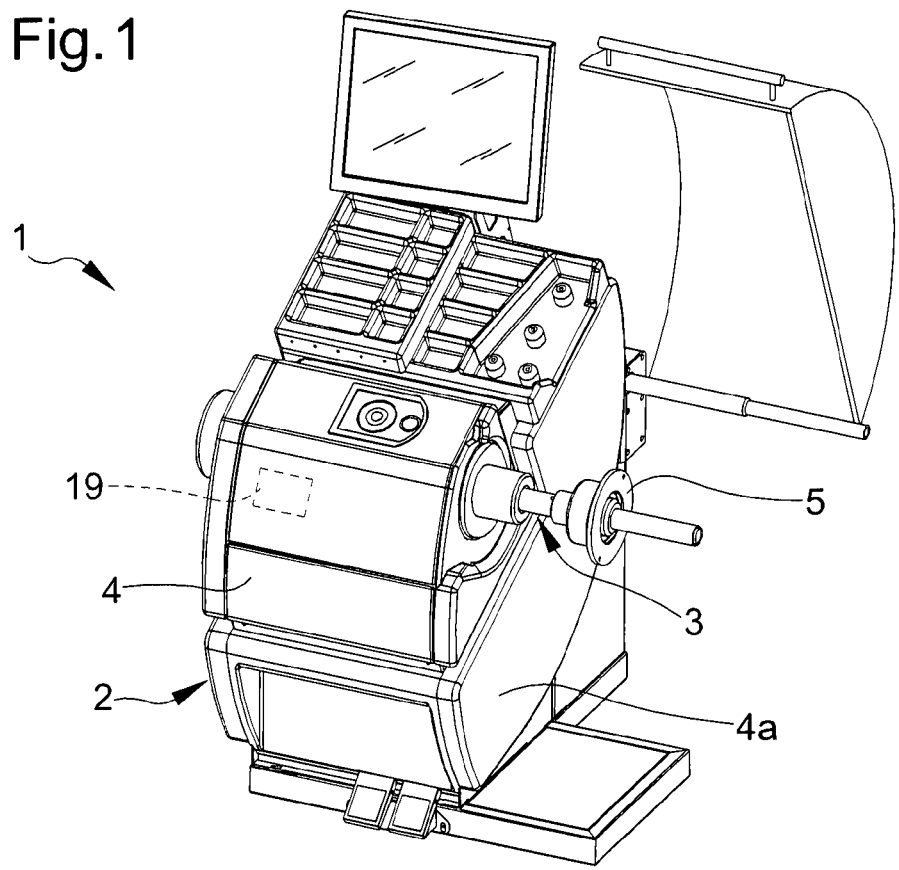
FIG. 1 is an axonometric view of the machine according to the invention.

With particular reference to such figures, globally indicated by 1 is a balancing machine for balancing vehicle wheels.

The machine 1 comprises a base frame 2 for resting on the ground, on which is mounted a balancing shaft 3 for balancing a wheel R of vehicles to be balanced.

The base frame 2 comprises a main block 4 having a side panel 4a from which the balancing shaft 3 extends overhanging horizontally.

Figure 2:
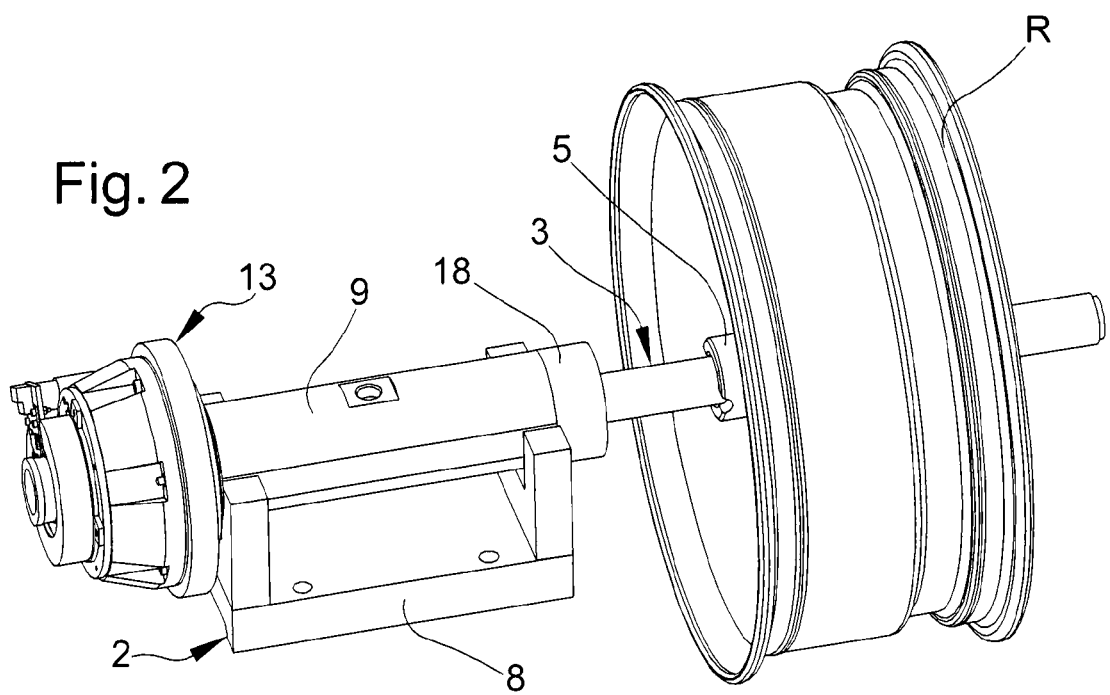
FIG. 2 is an axonometric view of a component part of the machine according to the invention.

The wheel R comprises an inner rim on which is mounted an outer tyre; in FIG. 2, the wheel R is only represented by its rim.

The wheel R can be fitted on the balancing shaft 3 in a substantially coaxial way to the central rolling axis thereof.

For this purpose, the balancing shaft 3 bears a grip unit 5 which permits withholding the centre of the wheel R.

On the base frame 2 is fitted a rotoidal resting unit 6, 7 which supports the balancing shaft 3 in a revolving way around its own axis.

In this respect, it is underlined that, inside the main block 4, the base frame 2 comprises a small base 8 supporting a substantially horizontal tubular body 9.

The tubular body 9 houses the rotoidal resting unit 6, 7 and at least a part of the balancing shaft 3 inside it.

More in detail, the rotoidal resting unit 6, 7 comprises a proximal rotoidal bearing 6 and a distal rotoidal bearing 7; in this respect it is pointed out that, in the present treatise, the adjectives "distal" and "proximal" are used with reference to the position of the wheel R mounted on the balancing shaft 3, and consequently the proximal rotoidal bearing 6 is the outermost one, closest to the wheel R, while the distal rotoidal bearing 7 is the innermost one, furthest from the wheel R.

According to the position of the rotoidal resting unit 6, 7, the balancing shaft 3 can be divided into a resting portion 10, extending substantially between the rotoidal bearings 6, 7, and a first overhanging portion 11, extending overhanging from the proximal rotoidal bearing 6 and in correspondence to which the wheel R can be fixed.

In the particular embodiment shown in the illustrations, furthermore, the balancing shaft 3 also comprises a second overhanging portion 12, extending overhanging from the distal rotoidal bearing 7 and with which motor means 13 are associated for placing the balancing shaft 3 in rotation around its own axis.

Usefully, the motor means 13 consist of an electric motor of the "torque" type and comprise a statoric annular element 14 associated with the base frame 2 and a rotoric annular element 15 associated with the balancing shaft 3.

The annular elements 14, 15 are arranged one inside the other coaxially to the balancing shaft 3 and are motor driven to rotate the one with respect to the other.

More in detail, the statoric annular element 14 is arranged outside the rotoric annular element 15 and is made integral with the tubular body 9 in a coaxial way to this.

The rotoric annular element 15, instead, is made integral with the second overhanging portion 12.

In this respect, it is pointed out that the use of an electric motor coaxial to the balancing shaft 3 permits transmitting a torque driving force without transversally stressing the balancing shaft 3, as would instead occur if an out-of-axis motor and a transmission belt were adopted.

This clearly favours not only drive transmission but also the measurement of the unbalance of the wheel R which, as will be better described below, depends on the mechanical stresses affecting the balancing shaft 3.

Similarly, the particular solution of connecting the motor means 13 on the second overhanging portion 12 helps the machine 1 to operate properly inasmuch as, as will be better explained below, the measurement of the unbalance of the wheel R occurs in correspondence to the first overhanging portion 11 and is not affected by the presence of the motor means 13 on the second overhanging portion 12.

Alternative embodiments cannot however be ruled out wherein the motor means 13 are of different type to those shown in the illustrations.

In the same way, alternative solutions cannot be ruled out wherein the balancing shaft 3 only extends as far as the distal rotoidal bearing 7 and does not have the second overhanging portion 12; in this case, the motor means 13 can be connected to the resting portion 10 of the balancing shaft 3.

The balancing shaft 3 comprises at least a measuring section 16 which is magnetized and, close to this, generates a magnetic field.

By effect of the unbalance of the wheel R in rotation on the balancing shaft 3, the measuring section. 16 is subject to a stress condition; in this respect, it is emphasized that within the ambit of the present treatise, by the term "stress condition" is meant that, in the presence of the wheel R, the measuring section 16 undergoes an internal tension and/or dimensional deformation deriving from the state of torsion-bending of the balancing shaft 3.

Due to a magnetostrictive effect, the magnetic field generated by the magnetization of the measuring section 16 varies according to the stress condition affecting the measuring section 16 and such variations can be measured.

For this purpose, in the proximity of the measuring section 16 are arranged magnetic field sensor means 17, 18 which are suitable for detecting, by magnetostrictive effect, the stress condition of the measuring section 16 and are operatively associated with a processing and control unit 19 suitable for determining the unbalance of the wheel starting from the stress condition of the measuring section 16.

Usefully, the measuring section 16 is arranged in correspondence to the first overhanging portion 11, i.e., along the part of the balancing shaft 3 which, by directly sustaining the wheel R, is more subject to tensioning and, deformation.

Even more in detail, the measuring section 16 is arranged in the proximity of the proximal rotoidal bearing 6, i.e., at the point of the balancing shaft 3 where the stress condition is highest and where it is simpler, more practical and easier to determine magnetic field variations by magnetostrictive effect.

In the embodiment shown in the figures from 3 to 5, the balancing shaft 3 consists of a longitudinal frame made in a single body piece which defines the resting portion 10, the first overhanging portion 11 and the second overhanging portion 12, and which is magnetized at least in part in correspondence to the measuring section 16.

In other words, the longitudinal frame 3 can only be magnetized in correspondence to one longitudinal part which goes to make up the measuring section 16.

Alternatively, the longitudinal frame 3 can be fully magnetized, in which case the measuring section 16 is defined by that portion of the balancing shaft 3 which is in the proximity of the magnetic field sensor means 17, 18 and on which the stress condition is determined.

Figure 6:
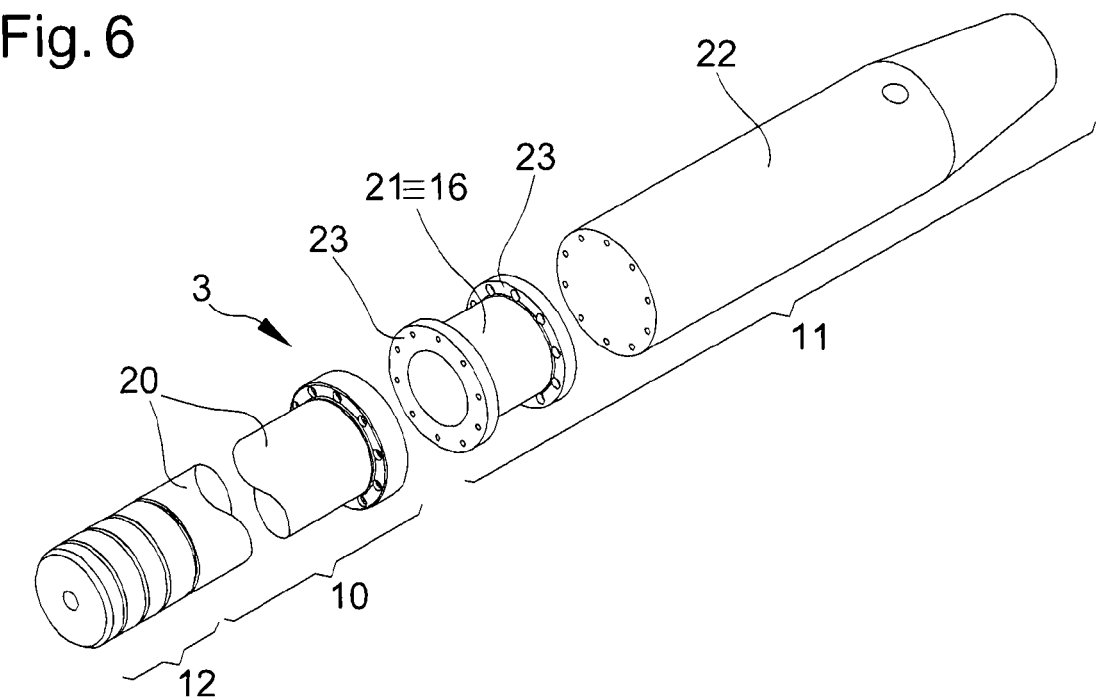
FIG. 6 is an exploded view which illustrates an alternative embodiment of the balancing shaft of the machine according to the invention.
Figure 7:
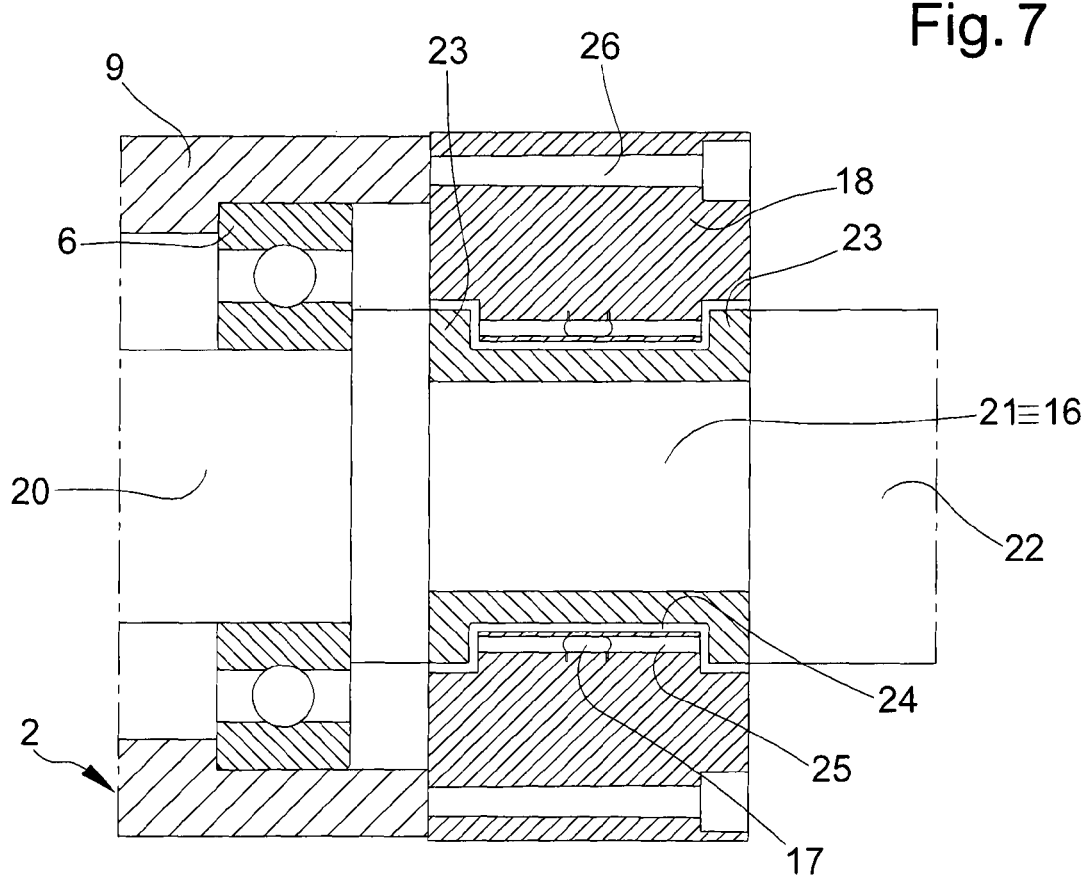
FIG. 7 is a longitudinal section view of a detail of the machine according to the invention having the balancing shaft of FIG. 6.

In the embodiment shown in the FIGS. 6 and 7, on the other end, the balancing shaft 3 is obtained by the assembly of several component parts and, in detail, comprises:
- a first longitudinal element 20, defining the resting portion 10 and the second overhanging portion 12;
- a second longitudinal element 21, which is magnetized and defines the measuring section 16; and
- a third longitudinal element 22, onto which the wheel R can be fixed.

The longitudinal elements 20, 21, 22 are made separate and joined in succession the one to the other by means of connection means, e.g., of the threaded type, or other joining systems, such as welding or the like.

In this respect, the second longitudinal element 21 is defined by a sleeve with fastening flanges 23 which allow screwing up to the first longitudinal element 20 and to the third longitudinal element 22.

Conveniently, in this embodiment the first longitudinal element 20 and the third longitudinal element 22 can be without magnetization, leaving only the second longitudinal element 21, intended to perform as measuring section 16, to be magnetized.

Advantageously, the magnetic field sensor means 17, 18 comprise a plurality of magnetometer elements 17 which detect the magnetic field of the measuring section 16 and transduce it into an electronic signal which is then processed by the processing and control unit 19 to determine the unbalance of the wheel R.

The magnetometer elements 17 are arranged substantially around the measuring section 16.

To maintain the magnetometer elements 17 in the desired position, the magnetic field sensor means 17, 18 also comprise a ring-shaped body 18 arranged so as to surround the balancing shaft 3 and supporting the magnetometer elements 17.

For this purpose, the ring-shaped body 18 comprises a central recess 24, wherein the balancing shaft 3 can be fitted without contact, and a plurality of axial cavities 25, wherein the magnetometer elements 17 are housed.

The magnetometer elements 17 and the relative axial cavities 25 are arranged in the proximity of the central recess 24 so as to appear in the proximity of the measuring section 16 and facilitate the measuring of its magnetic field.

The magnetometer elements 17 are distributed on the ring-shaped body 18 with a constant pitch and, preferably, there are four of them, placed at 90° the one to the other.

More in detail, the four magnetometer elements 17 are arranged in positions corresponding to "3 o'clock", "6 o'clock", "9 o'clock" and "12 o'clock" respectively, by the expressions "3 o'clock", "6 o'clock", "9 o'clock" and "12 o'clock" meaning the relative angular positions on the ring-shaped body 18 hypothetically split up into twelve hours like the face of a clock, wherein "6 o'clock" and "12 o'clock" are therefore defined by the intersection of the ring-shaped body 18 with the vertical plane on which lies the balancing shaft 3, while "3 o'clock" and "9 o'clock" are defined by the intersection of the ring-shaped body 18 with the horizontal plane on which lies the balancing shaft 3.

The particular solution of providing four magnetometer elements 17 phase displaced by 90° the one from the other permits, on the one hand, investigating with great precision the entire area around the measuring section 16 which is affected by its magnetic field and, on the other, electronically connecting the four magnetometer elements 17 to form an electric bridge to measure.

Figure 3:
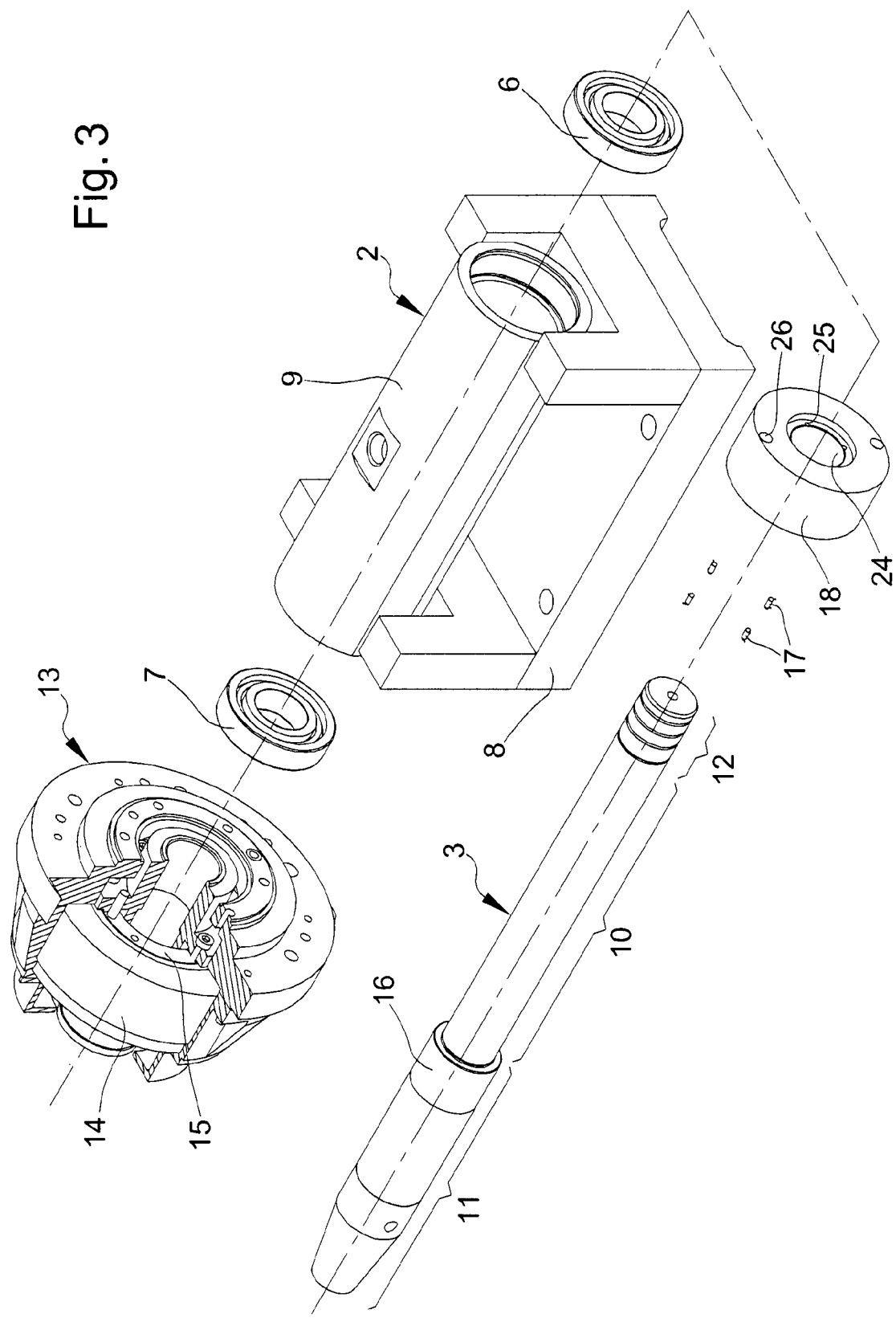
FIG. 3 is an exploded, partially broken-out view of the component part of FIG. 2.
Figure 4:
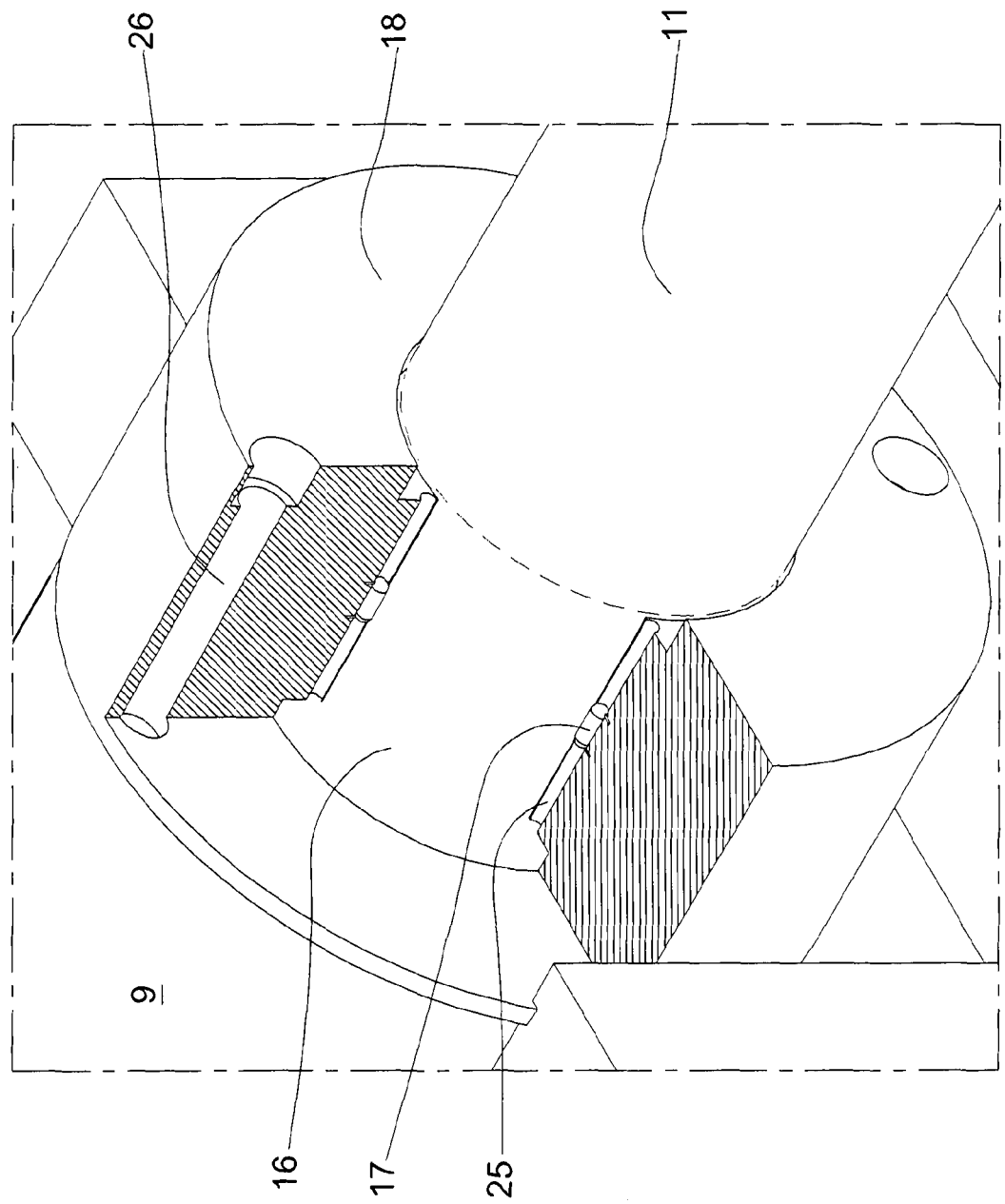
FIG. 4 is an axonometric, partially broken-out view and on enlarged scale of a detail of the component part of FIG. 2.
Figure 5:
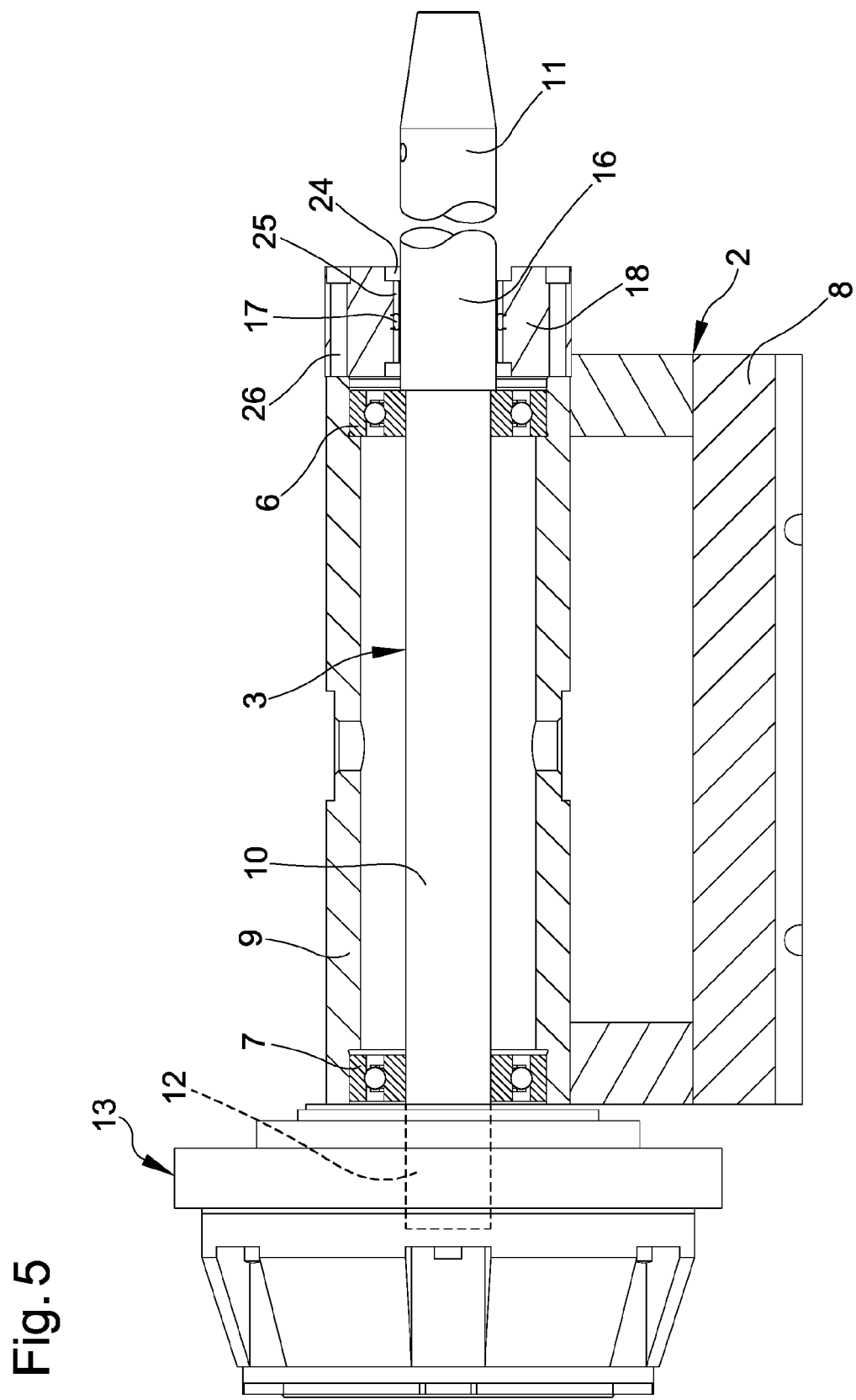
FIG. 5 is a longitudinal section view of the component part of FIG. 2.

In the embodiment shown in detail in the FIGS. 3 and 4, the ring-shaped body 18 consists of a single body piece and is associated in a substantially coaxial way with the tubular body 9.

For this purpose, the ring-shaped body 18 has specific coupling seats 26 which enable it to be screwed up to the tubular body 9.

Alternative embodiments cannot however be ruled out wherein the ring-shaped body 18 is obtained through the assembly of two or more components shaped like a circle arc, as in the case of the solution shown in the FIGS. 6 and 7 wherein, the presence of the fastening flanges 23 on the second longitudinal element 21, necessarily calls for the ring-shaped body 18 to be made in at least two pieces to permit the assembly of the machine 1.

Furthermore, alternative embodiments cannot be ruled out wherein the ring-shaped body 18 is fitted on the base frame 2 in a different position and way than those shown in the illustrations.

The operation of the machine 1 is the following.

When fitting the wheel R on the balancing shaft 3, the weight of the wheel R determines the occurrence of a stress condition which did not previously exist.

In other words, even the sole presence of the wheel R causes a slight bending of the balancing shaft 3 and, in particular, of its measuring section 16.

Due to the magnetostrictive effect, the stress condition determines a variation in the magnetic field generated by the measuring section 16, which is measured by the magnetometer elements 17 and transduced into a corresponding electronic signal.

Starting from this electronic signal, the processing and control unit 19 is able to determine the weight of the wheel R.

The amount of weight, combined with the dimensions of the wheel, which can be acquired in a traditional way, enables the processing and control unit 19 to:
- calculate the inertia of the wheel R;
- learn whether the wheel R belongs to a car, a truck or a motorcycle.

In accordance with such information; the machine 1 is hypothetically able to suggest a different balancing programme, which e.g. uses calculation criteria and parameters differentiated according to the type of wheel R, modifying the acquisition speed and the amount of approximation/tolerance according to the case in question.

When the wheel R is made to rotate, furthermore, its unbalance causes a series of further variations in the stress condition of the balancing shaft 3 and of the measuring section 16.

In this case as well, therefore, due to the magnetostrictive effect, the stress condition induced by the unbalance of the wheel R determines a variation in the magnetic field generated by the measuring section 16.

The pattern of the magnetic field is detected by the magnetic field sensor means 17, 18 which transduce it into a corresponding electronic signal.

Starting from this electronic signal, the processing and control unit 19 is able to determine the unbalance of the wheel R and to calculate the amount and the position of the balancing weight/s to be fitted to the wheel R to balance it.

The invention claimed is:

1. A balancing machine (1) for balancing vehicle wheels, comprising:
   at least a base frame (2);
   at least a balancing shaft (3) on which a vehicle wheel (R) to be balanced can be fixed;
   at least a rotoidal resting unit (6, 7), fitted on said base frame (2) and supporting said balancing shaft (3) in a revolving way around its own axis; and
   motor means (13) for placing in rotation said balancing shaft (3) around its own axis,
   wherein said balancing shaft (3) comprises at least a measuring section (16) which is magnetized and subject to a stress condition due to the unbalance of said wheel (R) revolving on said balancing shaft (3), in proximity of said measuring section (16) being arranged magnetic field sensor means (17, 18) which are suitable for detecting by magnetostrictive effect said stress condition of the measuring section (16) and are operatively connected to at least one processing and control unit (19) suitable for determining the unbalance of said wheel (R) starting from said stress condition of the measuring section (16),
   wherein said magnetic field sensor means (17, 18) comprise a plurality of magnetometer elements (17) arranged substantially around said measuring section (16),
   wherein said magnetic field sensor means (17, 18) comprise at least a ring-shaped body (18) arranged so as to surround said balancing shaft (3) and supporting said magnetometer elements (17), and
   wherein said magnetometer elements (17) are distributed on said ring-shaped body (18) with a constant pitch.

2. The machine (1) according to claim 1, wherein said magnetometer elements (17) are four in number and are distributed at 90° on said ring-shaped body (18).

3. The machine (1) according to claim 1, wherein said rotoidal resting unit (6, 7) comprises at least a proximal rotoidal bearing (6) and a distal rotoidal bearing (7), said balancing shaft (3) comprising a resting portion (10), which extends substantially between said rotoidal bearings (6, 7), and a first overhanging portion (11), which extends overhanging from said proximal rotoidal bearing (6) and on which said wheel (R) can be fixed.

4. The machine (1) according to claim 3, wherein said measuring section (16) is arranged adjacent to said first overhanging portion (11).

5. A balancing machine (1) for balancing vehicle wheels, comprising:
   at least a base frame (2);
   at least a balancing shaft (3) on which a vehicle wheel (R) to be balanced can be fixed;
   at least a rotoidal resting unit (6, 7), fitted on said base frame (2) and supporting said balancing shaft (3) in a revolving way around its own axis; and
   motor means (13) for placing in rotation said balancing shaft (3) around its own axis,
   wherein said balancing shaft (3) comprises at least a measuring section (16) which is magnetized and subject to a stress condition due to the unbalance of said wheel (R) revolving on said balancing shaft (3), in proximity of said measuring section (16) being arranged magnetic field sensor means (17, 18) which are suitable for detecting by magnetostrictive effect said stress condition of the measuring section (16) and are operatively connected to at least one processing and control unit (19) suitable for determining the unbalance of said wheel (R) starting from said stress condition of the measuring section (16),
   wherein said rotoidal resting unit (6, 7) comprises at least a proximal rotoidal bearing (6) and a distal rotoidal bearing (7), said balancing shaft (3) comprising a resting portion (10), which extends substantially between said rotoidal bearings (6, 7), and a first overhanging portion (11), which extends overhanging from said proximal rotoidal bearing (6) and on which said wheel (R) can be fixed, and
   wherein said balancing shaft (3) comprises a first longitudinal element (20) which defines said resting portion (10), a second longitudinal element (21) which is magnetized and defines said measuring section (16), and a third longitudinal element (22) on which said wheel (R) can be fixed, said longitudinal elements (20, 21, 22) being made separate and joined in succession together.

6. The machine (1) according to claim 5, wherein said second longitudinal element (21) comprises a sleeve with fastening flanges (23) to said first longitudinal element (20) and to said third longitudinal element (22).

7. A balancing machine (1) for balancing vehicle wheels, comprising:
   at least a base frame (2);
   at least a balancing shaft (3) on which a vehicle wheel (R) to be balanced can be fixed;
   at least a rotoidal resting unit (6, 7), fitted on said base frame (2) and supporting said balancing shaft (3) in a revolving way around its own axis; and
   motor means (13) for placing in rotation said balancing shaft (3) around its own axis,
   wherein said balancing shaft (3) comprises at least a measuring section (16) which is magnetized and subject to a stress condition due to the unbalance of said wheel (R) revolving on said balancing shaft (3), in proximity of said measuring section (16) being arranged magnetic field sensor means (17, 18) which are suitable for detecting by magnetostrictive effect said stress condition of the measuring section (16) and are operatively connected to at least one processing and control unit (19) suitable for determining the unbalance of said wheel (R) starting from said stress condition of the measuring section (16), and
   wherein said motor means (13) comprise a statoric annular element (14) and a rotoric annular element (15), said annular elements (14, 15) being arranged one inside the other coaxially to said balancing shaft (3) and being motor driven to rotate the one with respect to the other.

8. The machine (1) according to claim 7, wherein said magnetic field sensor means (17, 18) comprise a plurality of magnetometer elements (17) arranged substantially around said measuring section (16).

9. The machine (1) according to claim 8, wherein said ring-shaped body (18) comprises a plurality of axial cavities (25) and wherein said magnetometer elements (17) are fitted.

10. The machine (1) according to claim 8, wherein said magnetic field sensor means (17, 18) comprise at least a ring-shaped body (18) arranged so as to surround said balancing shaft (3) and supporting said magnetometer elements (17).

11. The machine (1) according to claim 10, wherein said base frame (2) comprises at least a tubular body (9) which houses said rotoidal resting unit (6, 7) and with which said ring-shaped body (18) is substantially coaxial.

12. The machine (1) according to claim 7, wherein said magnetometer elements (17) are distributed on said ring-shaped body (18) with a constant pitch.

13. The machine (1) according to claim 12, wherein said magnetometer elements (17) are four in number and are distributed at 90° on said ring-shaped body (18).

14. The machine (1) according to claim 7, wherein said rotoidal resting unit (6, 7) comprises at least a proximal rotoidal bearing (6) and a distal rotoidal bearing (7), said balancing shaft (3) comprising a resting portion (10), which extends substantially between said rotoidal bearings (6, 7), and a first overhanging portion (11), which extends overhanging from said proximal rotoidal bearing (6) and on which said wheel (R) can be fixed.

15. The machine (1) according to claim 14, wherein said measuring section (16) is arranged adjacent to said first overhanging portion (11).

16. The machine (1) according to claim 15, wherein said measuring section (16) arranged adjacent to said first overhanging portion (11) is in proximity of said proximal rotoidal bearing (6).

17. The machine (1) according to claim 14, wherein said balancing shaft (3) comprises a second overhanging portion (12), which extends overhanging from said distal rotoidal bearing (7).

18. The machine (1) according to claim 14, wherein said balancing shaft (3) comprises a longitudinal frame made in a single body piece which defines said resting portion (10) and said first overhanging portion (11) and which is magnetized at least in part.

19. The machine (1) according to claim 14, wherein said balancing shaft (3) comprises a first longitudinal element (20) which defines said resting portion (10), a second longitudinal element (21) which is magnetized and defines said measuring section (16), and a third longitudinal element (22) on which said wheel (R) can be fixed, said longitudinal elements (20, 21, 22) being made separate and joined in succession together.

20. The machine (1) according to claim 19, wherein said second longitudinal element (21) comprises a sleeve with fastening flanges (23) to said first longitudinal element (20) and to said third longitudinal element (22).

\* \* \* \* \*